US011770433B2

(12) United States Patent
Sodagar (10) Patent No.: US 11,770,433 B2
(45) Date of Patent: *Sep. 26, 2023

(54) FLEXIBLE INTEROPERABILITY AND CAPABILITY SIGNALING USING INITIALIZATION HIERARCHY

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,043

(22) Filed: Nov. 30, 2022

(65) Prior Publication Data

US 2023/0086569 A1    Mar. 23, 2023

Related U.S. Application Data

(63) Continuation of application No. 16/727,504, filed on Dec. 26, 2019, now Pat. No. 11,546,402.

(Continued)

(51) Int. Cl.
*H04L 65/75* (2022.01)
*H04L 67/02* (2022.01)
(Continued)

(52) U.S. Cl.
CPC ............ *H04L 65/75* (2022.05); *H04L 65/612* (2022.05); *H04L 65/65* (2022.05); *H04L 65/764* (2022.05);
(Continued)

(58) Field of Classification Search
CPC ......... H04L 65/65; H04L 65/60; H04L 65/61; H04L 65/764; H04N 21/8456;
(Continued)

(56) References Cited

U.S. PATENT DOCUMENTS

| 2014/0013103 | A1* | 1/2014 | Giladi | H04L 63/0428 |
| | | | | 713/150 |
| 2015/0081851 | A1* | 3/2015 | Oyman | H04W 36/0058 |
| | | | | 709/219 |

(Continued)

FOREIGN PATENT DOCUMENTS

| EP | 2941892 | B1 | 12/2018 |
| WO | 2013109885 | A1 | 7/2013 |

(Continued)

OTHER PUBLICATIONS

Extended European Search Report dated Aug. 29, 2022 in Application No. 19907866.8.

(Continued)

*Primary Examiner* — Mayran Y Abu Roumi
(74) *Attorney, Agent, or Firm* — Sughrue Mion, PLLC (57) ABSTRACT

A method and apparatus include including, in a moving pictures experts group (MPEG) dynamic adaptive streaming over hypertext transfer protocol (DASH) media presentation description (MPD) file, an initialization presentation element that identifies an initialization presentation and one or more initialization groups included in the initialization presentation. An initialization group element that identifies an initialization group and one or more initialization sets included in the initialization group is included in the MPD file. An initialization set element that identifies an initialization set is included in the MPD file. The MPD file is transmitted to a client device.

18 Claims, 6 Drawing Sheets

| Period | Adaptation Set | Codec |
|---|---|---|
| P1 | AS1 | AVC |
| | AS2 | HEVC |
| | AS3 | AAC |
| | AS4 | IMSC1 |
| | As4 | WebVTT |
| P2 | AS1 | HEVC |
| | AS2 | USAC |
| | AS3 | IMCS1 |
| P3 | AS1 | HEVC |
| | AS2 | SHVC |
| | AS3 | AAC |
| | AS4 | MPEG-H |
| | AS5 | IMSC1 |
| P4 | AS1 | HEVC |
| | AS2 | VVC |
| | AS3 | AAC |
| | AS4 | IMSC1 |

Related U.S. Application Data (60) Provisional application No. 62/788,427, filed on Jan. 4, 2019.

(51) Int. Cl.
*H04N 21/84* (2011.01)
*H04N 21/2343* (2011.01)
*H04L 65/65* (2022.01)
*H04L 65/612* (2022.01)

(52) U.S. Cl.
CPC ......... *H04L 67/02* (2013.01); *H04N 21/2343* (2013.01); *H04N 21/84* (2013.01)

(58) Field of Classification Search
CPC ........... H04N 21/2407; H04N 21/8106; H04N 21/233; H04N 21/2662; H04W 36/0058
See application file for complete search history.

(56) References Cited

U.S. PATENT DOCUMENTS

| | | |
|---|---|---|
| 2016/0261665 A1* | 9/2016 | Stockhammer ......... H04L 65/65 |
| 2016/0269459 A1 | 9/2016 | Harden et al. |
| 2016/0323348 A1* | 11/2016 | Bradbury .............. H04L 65/611 |
| 2017/0094288 A1 | 3/2017 | Hannuksela |
| 2019/0036995 A1 | 1/2019 | Zhang |
| 2019/0103122 A1 | 4/2019 | Hirabayashi et al. |
| 2019/0104332 A1* | 4/2019 | Hirabayashi ....... H04N 21/2407 |
| 2019/0342628 A1 | 11/2019 | Sakai |
| 2020/0154138 A1 | 5/2020 | Song et al. |

FOREIGN PATENT DOCUMENTS

| | | |
|---|---|---|
| WO | 2017/169727 A1 | 10/2017 |
| WO | 2017169890 A1 | 10/2017 |

OTHER PUBLICATIONS

Iraj Sodagar, "[AMD5] Updated text: Initialization Sets and other parts", MPEG Meeting, ISO/IEC JTC1/SC29 WG11 M47198, Jul. 16, 2019, XP030222362, Geneva, Retrieved from the Internet: URL:http://phenix.int-evry.fr/mpeg/doc_end_user/documents/126_Geneva/wg11/m47198-v3-m47198-v1 -m47198-UpdateonInitializationSets.zipISO_IEC_23009-1_2014_SoDAM5-revisions.docx (60 total pages).

Iraj Sodagar, "DASH AMD5: On Initialization Sets", ISO/IEC JTC1/SC29/WG11 M46213, Jan. 9, 2019, XP030214755, Marrakech, MAR, Retrieved from the Internet: URL:http://phenix.int-evry.fr/mpeg/doc_end_user/documents/125_Marrakech/wg11 /m46213-v1 -m46213-InitializationSets.zip m46213-InitializationSets.docx (6 pages total).

Written Opinion dated Mar. 24, 2020 from the International Bureau in application No. PCT/US19/68709.

International Search Report dated Mar. 24, 2020 from the International Bureau in application No. PCT/US19/68709.

Office Action dated Apr. 24, 2023 in Korean Application No. 10-2021-7023992.

* cited by examiner

FIG. 1A

| Period | AdaptationSet | Codec |
|---|---|---|
| P1 | AS1 | AVC |
|  | AS2 | HEVC |
|  | AS3 | AAC |
|  | AS4 | IMSC1 |
|  | AS4 | WebVTT |
| P2 | AS1 | HEVC |
|  | AS2 | USAC |
|  | AS3 | IMCS1 |
| P3 | AS1 | HEVC |
|  | AS2 | SHVC |
|  | AS3 | AAC |
|  | AS4 | MPEG-H |
|  | AS5 | IMSC1 |
| P4 | AS1 | HEVC |
|  | AS2 | VVC |
|  | AS3 | AAC |
|  | AS4 | IMSC1 |

| Initialization Set | Initialization Group | Initialization Presentation |
|---|---|---|
| 1. AVC<br>2. HEVC<br>3. SHVC<br>4. VVC<br>5. AAC<br>6. MPEG-H<br>7. USAC<br>8. WebVTT<br>9. IMSC1 | IG1:<br>• AVC<br>• HEVC<br><br>IG2:<br>• HEVC<br>• SHVC<br><br>IG3:<br>• AAC<br>• USAC | IP1:<br>• IG1<br>• IG2<br><br>IP2:<br>• IG1<br>• IG2<br>• IMSC1 |

… # FLEXIBLE INTEROPERABILITY AND CAPABILITY SIGNALING USING INITIALIZATION HIERARCHY

CROSS-REFERENCE TO RELATED APPLICATION

This is a continuation application of U.S. application Ser. No. 16/727,504, filed Dec. 26, 2019, which claims priority from U.S. Provisional Patent Application No. 62/788,427, filed on Jan. 4, 2019 in the U.S. Patent and Trademark Office, the disclosure of which is incorporated herein by reference in its entirety.

BACKGROUND

The draft specification ISO/IEC/JTC1/SC29 WG11 N18057: Text of ISO/IEC 23009-1:2014 DAM 5 on device information and other extensions includes two tools for signaling interoperability points and capabilities: flexible interoperability (TOP) signaling (e.g., signaling of dynamic adaptive streaming over hypertext transfer protocol (DASH) profiles and interoperability points using Expressive Interoperability descriptors) and Initialization Sets.

SUMMARY

According to an aspect of the disclosure, a method for using an initialization hierarchy may include including, by a device, in a moving pictures experts group (MPEG) dynamic adaptive streaming over hypertext transfer protocol (DASH) media presentation description (MPD) file, an initialization presentation element that identifies an initialization presentation and one or more initialization groups included in the initialization presentation; including, by the device, in the MPD file, an initialization group element that identifies an initialization group and one or more initialization sets included in the initialization group; including, by the device, in the MPD file, an initialization set element that identifies an initialization set; and transmitting, by the device, the MPD file to a client device.

According to an aspect of the disclosure, a device includes at least one memory configured to store program code; at least one processor configured to read the program code and operate as instructed by the program code, the program code may include including code configured to cause the at least one processor to: include, in a moving pictures experts group (MPEG) dynamic adaptive streaming over hypertext transfer protocol (DASH) media presentation description (MPD) file, an initialization presentation element that identifies an initialization presentation and one or more initialization groups included in the initialization presentation; include, in the MPD file, an initialization group element that identifies an initialization group and one or more initialization sets included in the initialization group; and include, in the MPD file, an initialization set element that identifies an initialization set; and transmitting code configured to cause the at least one processor to transmit the MPD file to a client device.

According to an aspect of the disclosure, a non-transitory computer-readable medium may store instructions including one or more instructions that, when executed by one or more processors of a device, cause the one or more processors to: include, in a moving pictures experts group (MPEG) dynamic adaptive streaming over hypertext transfer protocol (DASH) media presentation description (MPD) file, an initialization presentation element that identifies an initialization presentation and one or more initialization groups included in the initialization presentation; include, in the MPD file, an initialization group element that identifies an initialization group and one or more initialization sets included in the initialization group; include, in the MPD file, an initialization set element that identifies an initialization set; and transmit the MPD file to a client device.

DETAILED DESCRIPTION

The Text of 23009-1 DAMS includes a section on Initialization Sets and Flexible IOP signaling. The present disclosure extends the concept to initialization hierarchy, which fixes the shortcoming of the initialization sets, and enables flexible interoperability points signaling as well as defining the capabilities for the client to play the content.

One of the key features for Internet streaming is that the interoperability points (and/or playback capabilities) should be signaled in the manifest. The DASH standard has a simple @profile attribute, and may require defining a scheme id uniform resource identifier (URI) for every combination of set of features.

Flexible IOP signaling provides an expressive language to provide the capabilities, but the client might need to implement the parsing capabilities of the language, and identifiers for each feature might need to be developed.

Initialization sets provide a mechanism to copy the setting for each adaptation set/representation before the actual periods, so that a client uses the same element and attributes used in adaptation sets as well as the uniform resource locator (URL) for initialization segments, to signal the capabilities needed for playback of the corresponding adaptation sets. Initialization sets provide an interoperability point signaling on a single point but might not provide a mechanism to combine multiple points together, and create a comprehensive interoperability point/capabilities signaling.

The initialization sets list the (common denominator of) the initialization segments. That is, for every initialization segment, every period should have one adaptation set that conforms to that initialization segment.

The following core use-cases are not currently addressed by the initialization sets.

First, in the case that the content period includes a video codec and the ad period includes a different video codec, it cannot be addressed by the initialization sets. In other words, every period should have one adaptation set per one initialization set. Second, with initialization sets, it might not be clear to a client whether the client needs two or more codecs to play video, or if all periods have a single common codec. Therefore, a single codec might be adequate. Third, the initialization sets group together all minimum required capabilities for all periods and there is no way to signal the capabilities of periods optionally. Fourth, the current initialization sets do not have identifiers, and therefore each Initialization Set might not be capable of being identified uniquely for equivalence purposes. Signaling an initialization Set using identifiers enables a client recognizing the initialization set with its identifier without parsing and analyzing the initialization set's elements and attributes or download its initialization segments. This is especially useful when the initialization set is conforming to a common media application format (CMAF) or CMAF based media profile.

In order to address and enhance the initialization sets, embodiments of the present disclosure provide the concept and implementation of hierarchical initialization tools outlined below.

First, an embodiment of the present disclosure removes the requirement that all periods support every single initialization set. In order to allow various periods having different coders, the present disclosure changes the following requirement: "An Initialization Set provides a common set of media properties across the Media Presentation. If an Initialization Set is provided in an MPD with certain properties, there shall be at least one Adaptation Set in one of the Periods with the same properties. An Initialization Set may be selected at the start of a Media Presentation in order to establish the relevant decryption, decoding and rendering environment."

This change means that not every period needs to have at least one adaptation set compatible with each initialization set listed in the MPD.

Second, an embodiment of the disclosure introduces a new attribute to initialization sets ("@inAllPeriods"). If this attribute is set for one initialization set, it indicates every period in the media presentation description (MPD) file has at least one adaptation set that conforms to this initialization set.

The semantics of the "InitializationSet" element may be as follows. According to an embodiment, an "InitializationSet" element may include the following elements, attributes, uses, and descriptions. The element "InitiaizationSet" may include the description of "Initializaton Set Description." The element "@xlink:href" may include the use "O," and the description "specifies a reference to a remote element entity that shall contain exactly one element of type "InitializationSet." The element "@xlink:actuate" may include the use "OD" ("default: 'onRequest'), and the description "specifies the processing instructions, which can be either 'onLoad' or 'onRequest'." The element "@inAllPeriods" may include the use "O," and the description "if set to true, then there is at least one adaptation set in each period that conforms to this Initialization set" (the default value may be false). The element "@id" may include the use "M," and the description "specifies a unique identifier for this Initialization Set. The attribute shall be a unique unsigned integer value in the scope of the MPD." The element "@schemeIdUri" may include the use "O," and the description "Specifies a URI identifier for this Initialization Set. If present, the scheme shall be equivalent (conforming to and conformed by) to the initialization Set."

According to an embodiment, if an initialization set is common in all periods, i.e. there exists at least one adaptation set in each period that is compatible with the initialization set, then the initialization set's "@inAllPeriods" attribute may be set to "TRUE."

The present disclosure provides a new element "InitializationGroup" which signals a subset for playing back a media type during the entire presentation. The present disclosure adds a new element to indicate the minimum requirement for playback of a media type of all periods. This element lists the initializationSet's "@id." Any period may have at least one adaptation set that conforms to one of the initialization sets referenced in this element. Therefore, if a client supports all of the listed initialization sets in one "InitializationGroup" element, it may play the media type during the entire media presentation.

The semantics of the "InitializationGroup" element may be as follows. According to an embodiment, the element "InitializationSet" may include a description of "Initialization Set Description." The element "@xlink:href" may include the use of "O," and the description of "specifies a reference to a remote element entity that shall contain exactly one element of type InitializationGroup." The element "@xlink:actuate" may include the use of "OD" (default: 'onRequest'), and the description of "specifies the processing instructions, which can be either 'onLoad'" or 'onRequest.'" The element "@id" may include the use of "O," and the description of "specifies a unique identifier for this Initialization Group. The attribute shall be a unique unsigned integer value in the scope of the MPD." The element "@schemeIdUri" may include the use of "O," and the description of "Specifies a URI identifier for this Initialization Group. If present, the scheme shall be equivalent (conforming to and conformed by) to the initialization Sets listed @initializationSets." The element "@contentType" may include the use of "O," and the description of "specifies the content type of initialization Sets listed in the @initializationSets." The element "@initializationSets" may include the use of "1," and the description of "White separated list of initialization set's ids included in this initialization Group."

The present disclosure provides a new element of "InitializationPresentation," which is for signaling a subset for playing back the presentation for the entire duration. The present disclosure adds another element to indicate a complete presentation. The "InitializationPresentation" element includes the list of initialization sets that create a complete presentation. A client supporting all listed initialization sets of an initialization presentation can play the entire media presentation as intended by the service provider.

The semantics of the "InitializationPresentation" may be as follows. The element "InitializationPresentation" may include the use of "O," and the description of "Initialization Set description." The element "@xlink:href" may include the use of "O," and the description of "specifies a reference to a remote element entity that shall contain exactly one element of type InitializationGroup." The element "@xlink:actuate" may include the use of "OD" (default: "onRequest"), and the description "specifies the processing instructions, which can be either 'onLoad' or 'onRequest.'" The element "@id" may include the use "O," and the description "specifies a unique identifier for this Initialization Presentation. The attribute shall be a unique unsigned integer value in the scope of the MPD." The element "@schemeIdUri" may include the use "O," and the description of "Specifies a URI identifier for this Initialization Presentation. If present, the scheme shall be equivalent (conforming to and conformed by) to the initialization Groups and Sets listed @initializationGroups." The element "@initializationGroups" may include the use of "1," and the description of "White separated list of initialization Groups' ids and Initialization Sets' ids included in this initialization Group. Only Initialization Set's ids with @inAllPeriods value of true may be included in this attribute."

The present disclosure provides the following elements in the MPD file. The present disclosure provides additional elements in the MPD file to document the initialization sets for playing an entire presentation and also suggested presentation combination of various media types.

The semantics of the MPD elements may be as follows. The element "MPD" may include the description "The root element that carries the Media Presentation Description for a Media Presentation." The element "InitializationSet" may include the uses of "0" through "n," and the description of "specifies a suitable initialization for a specific media type for the presentation. If present, each Period of the Media Presentation shall include at least one Adaptation Set that can be played under when initialized by this Initialization Set. For details see clause 5.3.X." The element "InitializationGroup" may include the use of "0" through "n," and the description of "specifies a group of suitable initializations for a specific media type for the presentation. If present, each Period of the Media Presentation shall include at least one Adaptation Set that can be played under one of initialization set listed in this element. For details see clause 5.3.X." The element "InitializationPresentation" may include the use of "0" through "n," and the description of "specifies a collection of suitable initializations for this presentation. If present, each Period of the Media Presentation shall include at least one Adaptation Set per media type that can be played under when initialized by one of the Initialization Sets referenced by this element. For details see clause 5.3.X."

For the above elements, "M" may indicate that the use is mandatory, "O" may indicate that the use is optional, "OD" may indicate that the use is optional with a default value, "CM" may indicate that the use is conditionally mandatory. For elements, "<minOccurs> . . . <maxOccurs> (N=unbounded)."

Figure 1A:
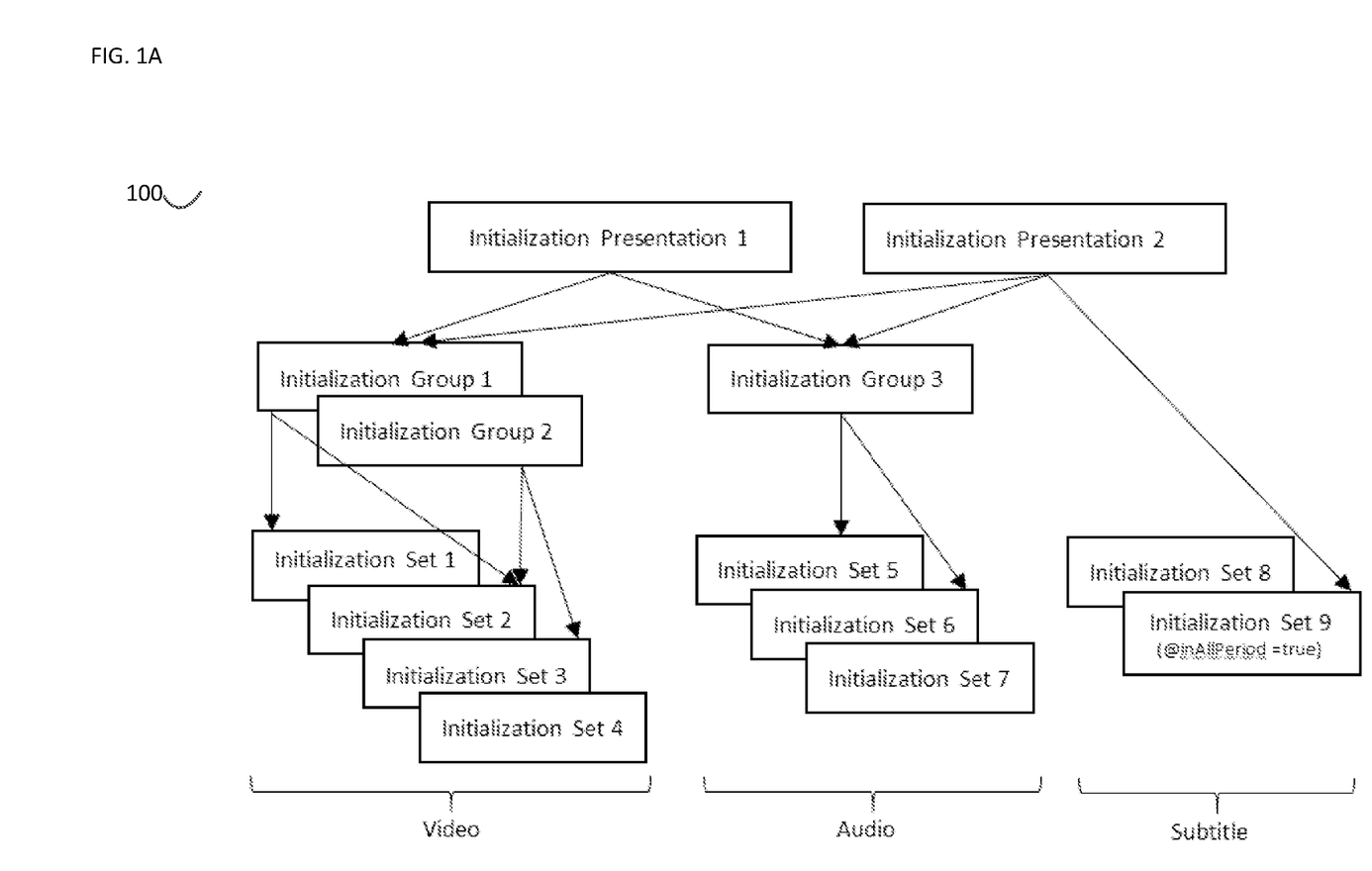
FIGS. 1A-1C are diagrams of an example overview of an embodiment described herein.
Figure 1B:
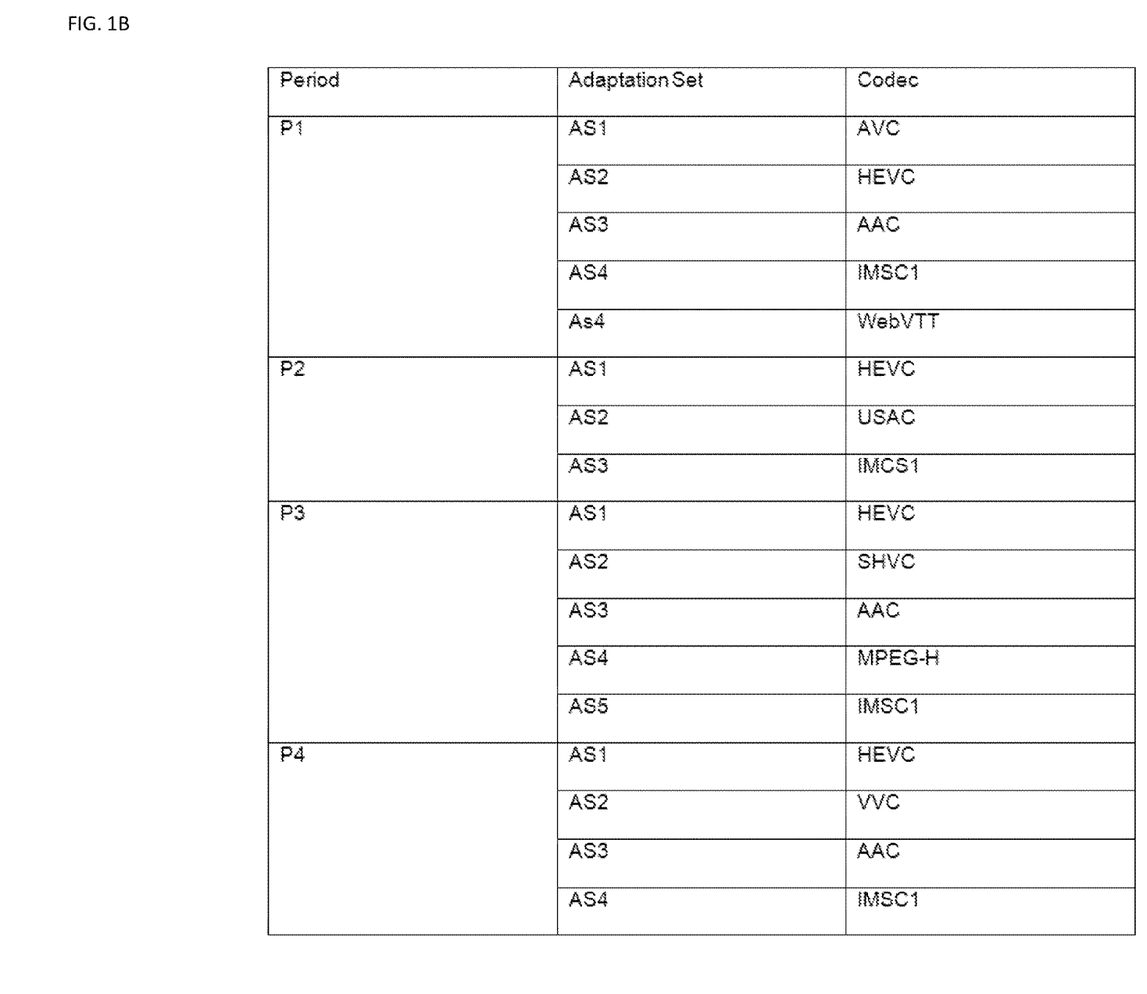
Figure 1C:
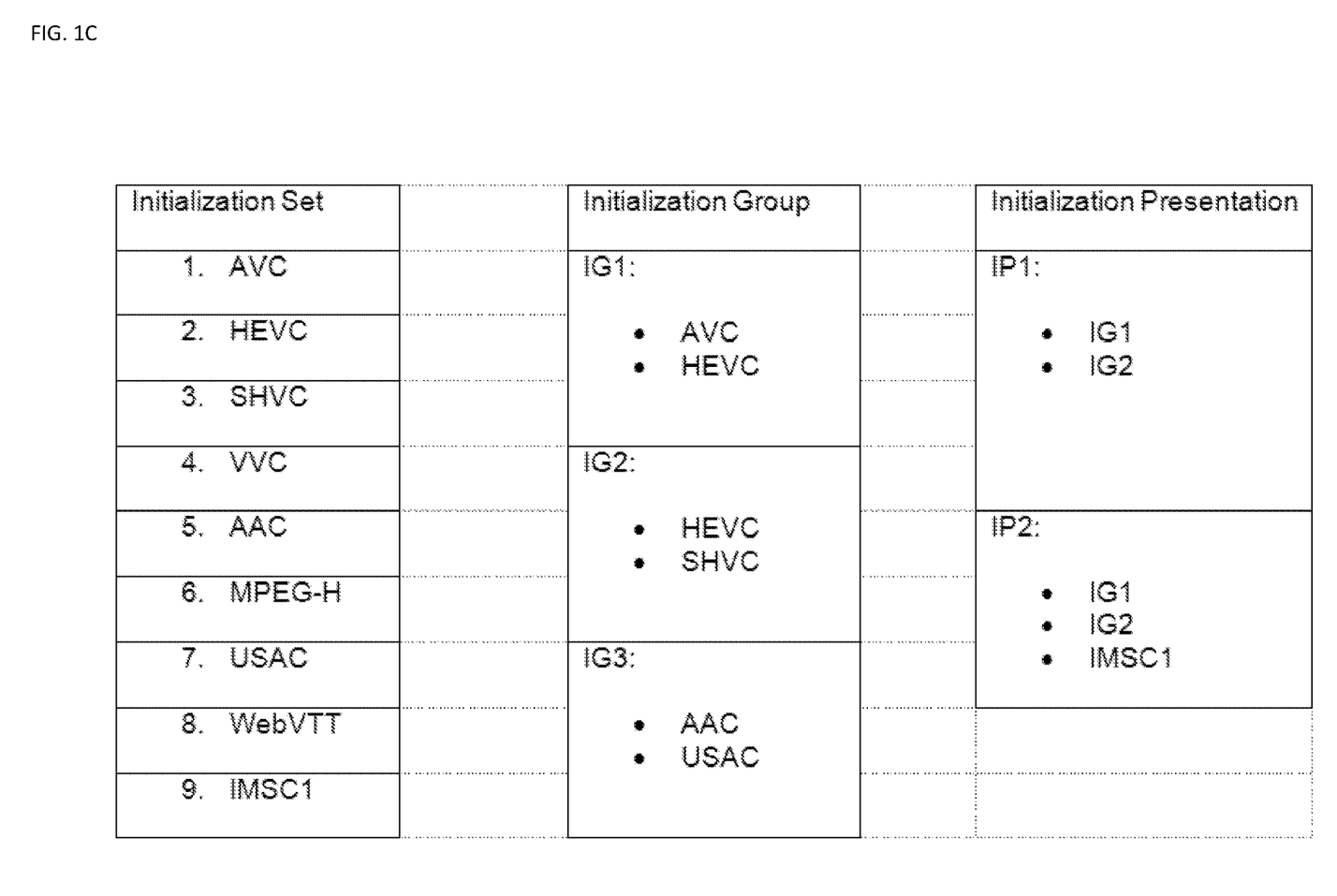

FIGS. 1A-1C are diagrams of an example use of the initialization hierarchy in signaling the capabilities as well as the recommended presentation in an MPD file 100. FIG. 1 is an example of initialization signaling. Each initialization groups defines the minimum requirement for playback of a media type for entire presentation, while each initialization presentation defines a meaningful multimedia presentation. In FIG. 1, the MPD file includes 3 different media types (e.g., video, audio and subtitles). The MPD file includes several periods which adaptation sets are described by different initialization sets for each media type (e.g., initialization sets 1 through 4 define the requirements for 4 different video decoders, initialization sets 5 through 7 define the requirements for 3 audio decoders, and initialization sets 8 and 9 define the requirements for 2 different subtitle parsers.

In FIG. 1, an initialization group 1 includes initialization sets 1 and 2, while initialization group 2 includes initialization sets 2 and 3, which means that a client can play the video during all periods if the client supports the decoders defined in initialization group 1 or initialization group 2. Similarly, initialization group 3 includes initialization sets 5 and 6, so a client supporting decoders defined by initialization sets 5 and 6 can play the audio during all periods. And finally, since initialization set 9 includes the element "@inAllPeriod" having a value set to true, a client supporting initialization set 9 can play the existing subtitles of all periods.

To define the suggested presentation, the MPD file includes two initialization presentations 1 and 2. Initialization presentation 1 defines a complete presentation that includes audio and video (i.e., the client might need to support initialization group 2 and initialization group 3). Initialization presentation 2 adds the support for playback of subtitle initialization set 9 to its presentation requirements.

Referring to FIG. 1B, consider the case that a live program includes several periods. The MPD may be initially published with a single period of the content P1. However, during the live streaming event, the MPD may be updated with new periods, including ads and content coming from different content providers. These periods are marked as P2, P3, etc. Although FIG. 1B depicts codecs, other features, such as profiles/levels, content protection, accessibility, viewpoints, frame packing, etc. can be changed.

Referring to FIG. 1C, an MPD file 100 may include the initialization hierarchy to schedule the hierarchy shown in FIG. 1.

Since each adaptation set may conform to an initialization set, there is no need to reference multiple initialization sets in an adaptation set. Therefore, this disclosure changes the following elements. The element "AdaptationSet" may include the description "Adaptation Set Description." The element "@initializationSetRef" may include the use of "O," and the description of "Specifies the Initialization set @id identifiers this adaptation set is conforming to."

Figure 2:
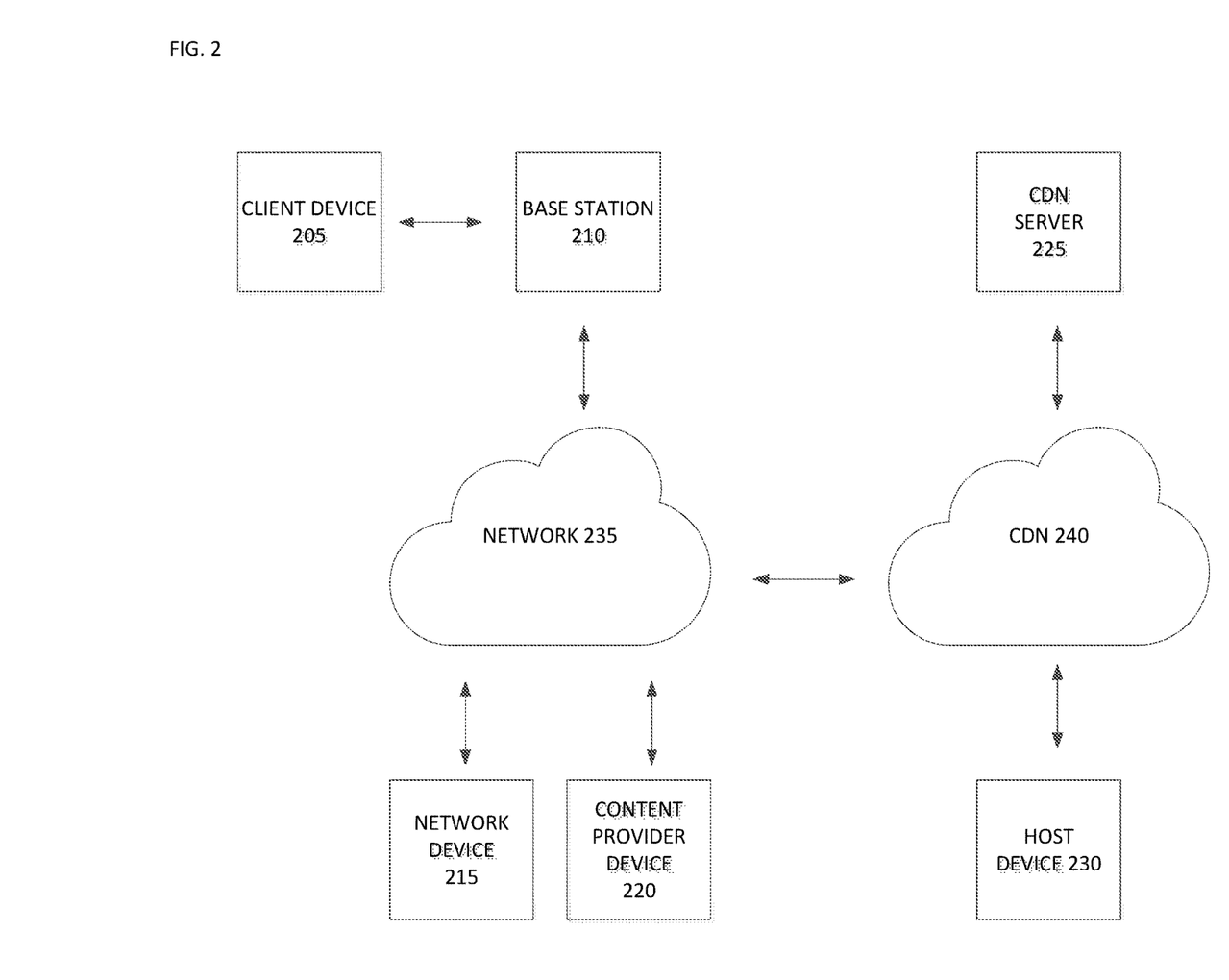
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 205, a base station 210, a network device 215, a content provider device 220, a CDN server 225, a host device 230, a network 235, and a CDN 240. Devices of environment 200 may interconnect via wired connections, wireless connections, or a combination of wired and wireless connections.

Client device 205 may include one or more devices capable of receiving, generating, storing, processing, and/or providing information associated with streaming media content. For example, client device 205 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device.

Client device 205 may request streaming media content by requesting segments of the media stream (e.g., using HyperText Transfer Protocol (HTTP) Live Streaming (HLS), Dynamic Adaptive Streaming over HTTP (DASH), HTTP Dynamic Streaming, HTTP Adaptive Streaming, Microsoft Smooth Streaming, or the like). According to an embodiment, the request may be transmitted to host device 230. Host device 230 may respond to the request by providing the requested segments to client device 205, and client device 205 may process the received segments for playback.

Base station 210 may include one or more devices capable of transferring streaming media traffic, such as audio, video, and/or other traffic, destined for and/or received from client device 205. According to an embodiment, base station 210 may include an evolved Node B (eNB) associated with a long term evolution (LTE) network. Additionally, or alternatively, base station 210 may be associated with a radio access network (RAN) that is not associated with an LTE network. Base station 210 may send traffic to and/or receive traffic from client device 205 via an air interface. According to an embodiment, base station 210 may include a small cell base station, such as a base station of a microcell, a picocell, and/or a femtocell.

Network device 215 may include one or more devices capable of receiving, processing, storing, and/or transferring traffic associated with network 235. For example, network device 215 may include a server, a gateway, a firewall, a router, or a similar device. According to an embodiment, network device 215 may be included in network 235. According to an embodiment, network device 215 may be included in base station 210.

As used herein, traffic may refer to communication (e.g., via a packet) between two or more devices of environment 200. As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

Content provider device 220 may include one or more devices capable of receiving, processing, storing, and/or providing information associated with streaming media content. For example, content provider device 220 may include a computing device, such as a server (e.g., an application server, a host server, a web server, an HTTP server, etc.), a network device, or a similar device.

CDN server 225 may include one or more devices capable of receiving, storing, processing, and/or providing information associated with streaming media content. For example, CDN server 225 may include a computing device, such as a server device or a similar device.

Host device 230 may include one or more devices capable of receiving, storing, processing, and/or providing streaming media content (e.g., one or more segments of streaming media content). For example, host device 230 may include a storage device, a server, or a similar device. Host device 230 may receive, from client device 205, requests for segments of the streaming media content. If a requested segment is stored by host device 230, then host device 230 may provide the requested segment to client device 205. If the requested segment is not stored by host device 230, then host device 230 may obtain the segment from content provider device 220 (e.g., by requesting and receiving the segment), may store the segment, and may provide the segment to client device 205.

Network 235 may include one or more wired and/or wireless networks. For example, network 235 may include a cellular network (e.g., an LTE network, a third generation (3G) network, a code division multiple access (CDMA) network, etc.), a public land mobile network (PLMN), a wireless local area network (e.g., a Wi-Fi network, etc.), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

CDN 240 may include one or more wired and/or wireless networks of devices that are capable of receiving, storing, processing, and/or providing streaming media content (e.g., one or more segments of the streaming media content). CDN 240 may include, for example, servers, data centers, or the like. According to an embodiment, CDN 240 may include host devices 245 and/or CDN server 225. One or more devices of CDN 240 may receive, from content provider device 220, streaming media content (e.g., one or more segments of a media stream) and may provide the streaming media content to client device 205.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
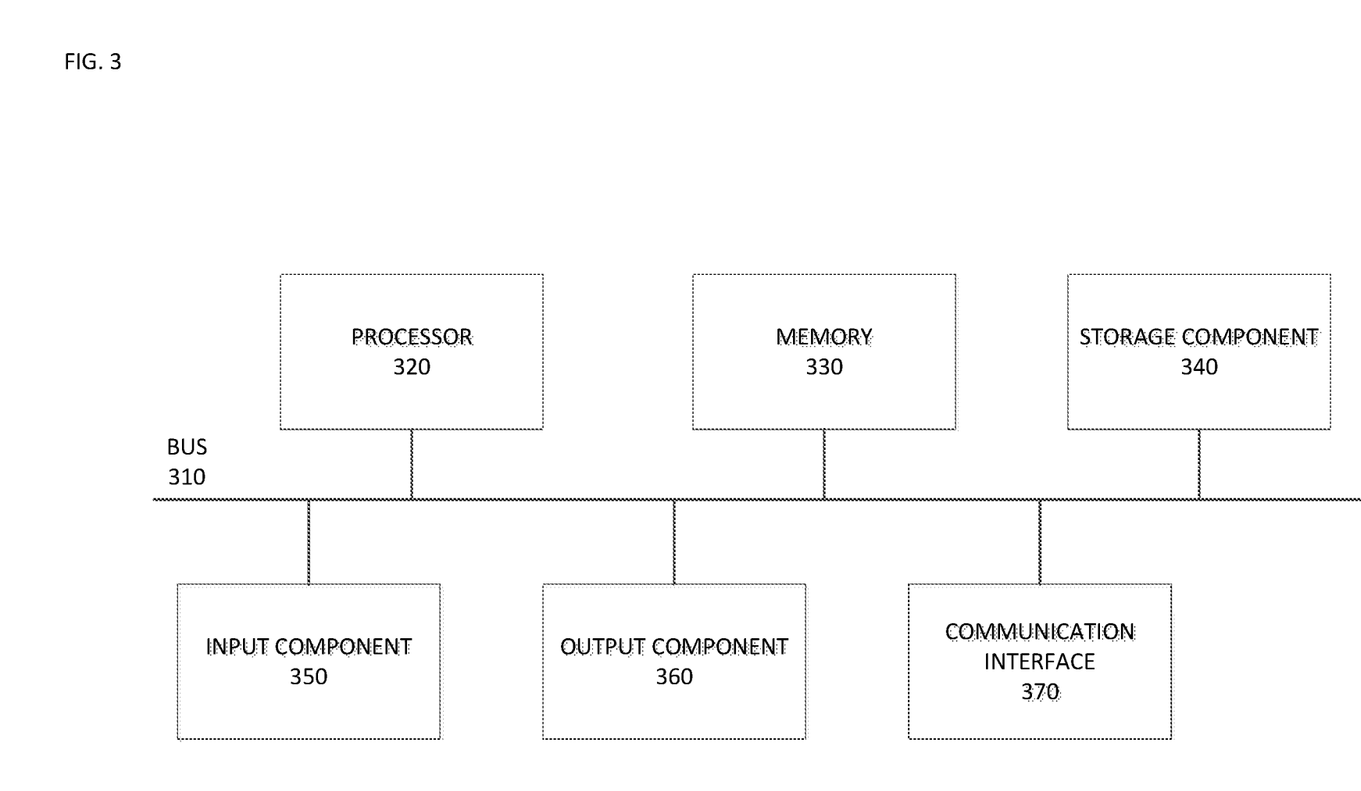
FIG. 3 is a diagram of example components of one or more devices of FIG. 2.

FIG. 3 is a diagram of example components of a device 300. Device 300 may correspond to client device 205, base station 210, network device 215, content provider device 220, CDN server 225, host device 230. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
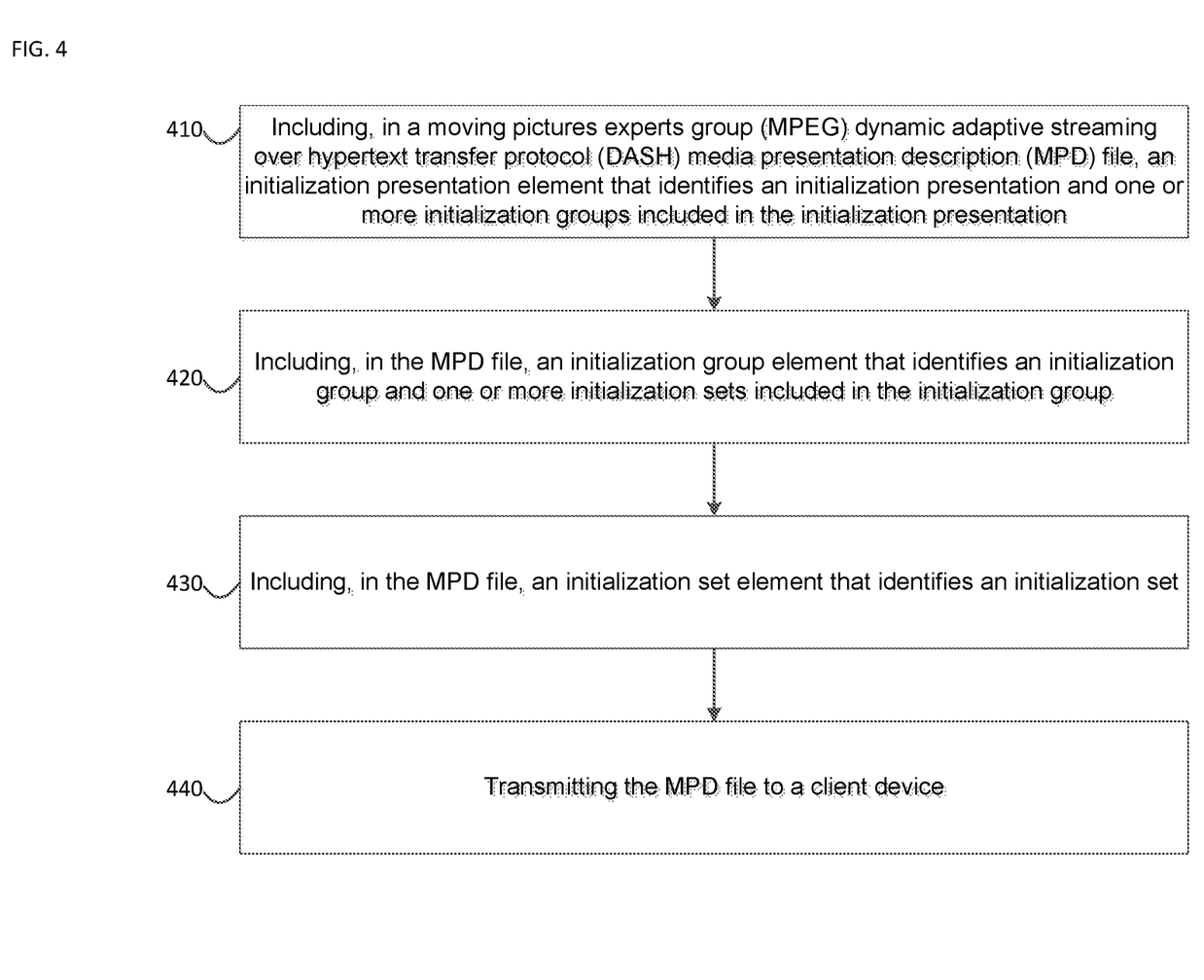
FIG. 4 is a flow chart of an example process described herein.

FIG. 4 is a flow chart of an example process 400 according to an aspect of the disclosure.

According to an embodiment, one or more process blocks of FIG. 4 may be performed by network device 215. According to an embodiment, one or more process blocks of FIG. 4 may be performed by another device or a group of devices separate from or including network device 215, such as client device 205, base station 210, network device 215, content provider device 220, CDN server 225, host device 230.

As shown in FIG. 4, process 400 may include including, in a moving pictures experts group (MPEG) dynamic adaptive streaming over hypertext transfer protocol (DASH) media presentation description (MPD) file, an initialization presentation element that identifies an initialization presentation and one or more initialization groups included in the initialization presentation (block 410).

As further shown in FIG. 4, process 400 may include including, in the MPD file, an initialization group element that identifies an initialization group and one or more initialization sets included in the initialization group (block 420).

As further shown in FIG. 4, process 400 may include including, in the MPD file, an initialization set element that identifies an initialization set (block 430).

As further shown in FIG. 4, process 400 may include transmitting the MPD file to a client device (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for using an initialization hierarchy, comprising:
    including, by a device, in a moving pictures experts group (MPEG) dynamic adaptive streaming over hypertext transfer protocol (DASH) media presentation description (MPD) file, an initialization presentation element that identifies an initialization presentation and one or more initialization groups included in the initialization presentation, wherein each of the one or more initialization groups specifies one or more initialization sets for playing a specific media type during an entire presentation of the MPD file, the specific media type being one of a video, an audio, and a subtitle;
    including, by the device, in the MPD file, an initialization group element that identifies an initialization group and one or more initialization sets included in the initialization group;
    including, by the device, in the MPD file, an initialization set element that identifies an initialization set; and
    transmitting, by the device, the MPD file to a client device,
    wherein not every period included in the MPD file has at least one adaptation set that conforms to one of the one or more initialization sets included in the initialization group element, and
    wherein the method further comprises including, by the device, in the MPD file, a period element that identifies one or more periods, but not every period included in the MPD file, associated with an adaptation set that conforms to one of the one or more initialization sets included in the initialization group element.

2. The method of claim 1, wherein the initialization set element includes a period element that identifies whether there is at least one period that conforms to the initialization set.

3. The method of claim 1, wherein the initialization group element includes a content type element that specifies a content type of the one or more initialization sets included in the initialization group.

4. The method of claim 1, wherein the initialization group element includes a set of initialization set identifiers that corresponds to the one or more initialization sets.

5. The method of claim 1, wherein the initialization presentation element includes a set of initialization group identifiers that corresponds to the one or more initialization groups.

6. The method of claim 1, further comprising:
including, by the device, in the MPD file, an adaptation set element that specifies one or more initialization set identifiers that conform to the adaptation set.

7. A device, comprising:
at least one memory configured to store program code;
at least one processor configured to read the program code and operate as instructed by the program code, the program code including:
including code configured to cause the at least one processor to:
include, in a moving pictures experts group (MPEG) dynamic adaptive streaming over hypertext transfer protocol (DASH) media presentation description (MPD) file, an initialization presentation element that identifies an initialization presentation and one or more initialization groups included in the initialization presentation, wherein each of the one or more initialization groups specifies one or more initialization sets for playing a specific media type during an entire presentation of the MPD file, the specific media type being one of a video, an audio, and a subtitle;
include, in the MPD file, an initialization group element that identifies an initialization group and one or more initialization sets included in the initialization group; and
include, in the MPD file, an initialization set element that identifies an initialization set; and
transmitting code configured to cause the at least one processor to transmit the MPD file to a client device,
wherein not every period included in the MPD file has at least one adaptation set that conforms to one of the one or more initialization sets included in the initialization group element, and
wherein the including code is further configured to cause the at least one processor to include, in the MPD file, a period element that identifies one or more periods, but not every period included in the MPD file, associated with an adaptation set that conforms to one of the one or more initialization sets included in the initialization group element.

8. The device of claim 7, wherein the initialization set element includes a period element that identifies whether there is at least one period that conforms to the initialization set.

9. The device of claim 7, wherein the initialization group element includes a content type element that specifies a content type of the one or more initialization sets included in the initialization group.

10. The device of claim 7, wherein the initialization group element includes a set of initialization set identifiers that corresponds to the one or more initialization sets.

11. The device of claim 7, wherein the initialization presentation element includes a set of initialization group identifiers that corresponds to the one or more initialization groups.

12. The device of claim 7, wherein the including code is further configured to cause the at least one processor to include, in the MPD file, an adaptation set element that specifies one or more initialization set identifiers that conform to the adaptation set.

13. A non-transitory computer-readable medium storing instructions, the instructions comprising: one or more instructions that, when executed by one or more processors of a device, cause the one or more processors to:
include, in a moving pictures experts group (MPEG) dynamic adaptive streaming over hypertext transfer protocol (DASH) media presentation description (MPD) file, an initialization presentation element that identifies an initialization presentation and one or more initialization groups included in the initialization presentation, wherein each of the one or more initialization groups specifies one or more initialization sets for playing a specific media type during an entire presentation of the MPD file, the specific media type being one of a video, an audio, and a subtitle;
include, in the MPD file, an initialization group element that identifies an initialization group and one or more initialization sets included in the initialization group;
include, in the MPD file, an initialization set element that identifies an initialization set; and
transmit the MPD file to a client device,
wherein not every period included in the MPD file has at least one adaptation set that conforms to one of the one or more initialization sets included in the initialization group element, and
wherein the one or more instructions further cause the one or more processors to include, in the MPD file, a period element that identifies one or more periods, but not every period of the MPD file, associated with an adaptation set that conforms to one of the one or more initialization sets included in the initialization group element.

14. The non-transitory computer-readable medium of claim 13, wherein the initialization set element includes a period element that identifies whether there is at least one period that conforms to the initialization set.

15. The non-transitory computer-readable medium of claim 13, wherein the initialization group element includes a content type element that specifies a content type of the one or more initialization sets included in the initialization group.

16. The non-transitory computer-readable medium of claim 13, wherein the initialization group element includes a set of initialization set identifiers that corresponds to the one or more initialization sets.

17. The non-transitory computer-readable medium of claim 13, wherein the initialization presentation element includes a set of initialization group identifiers that corresponds to the one or more initialization groups.

18. The non-transitory computer-readable medium of claim 13, wherein the one or more instructions further cause the one or more processors to:

include, in the MPD file, an adaptation set element that specifies one or more initialization set identifiers that conform to the adaptation set.

\* \* \* \* \*